Dec. 22, 1942.  A. W. MARBURG ET AL  2,305,590
PRESSURE SEALED JOINT
Filed April 16, 1941   2 Sheets-Sheet 1
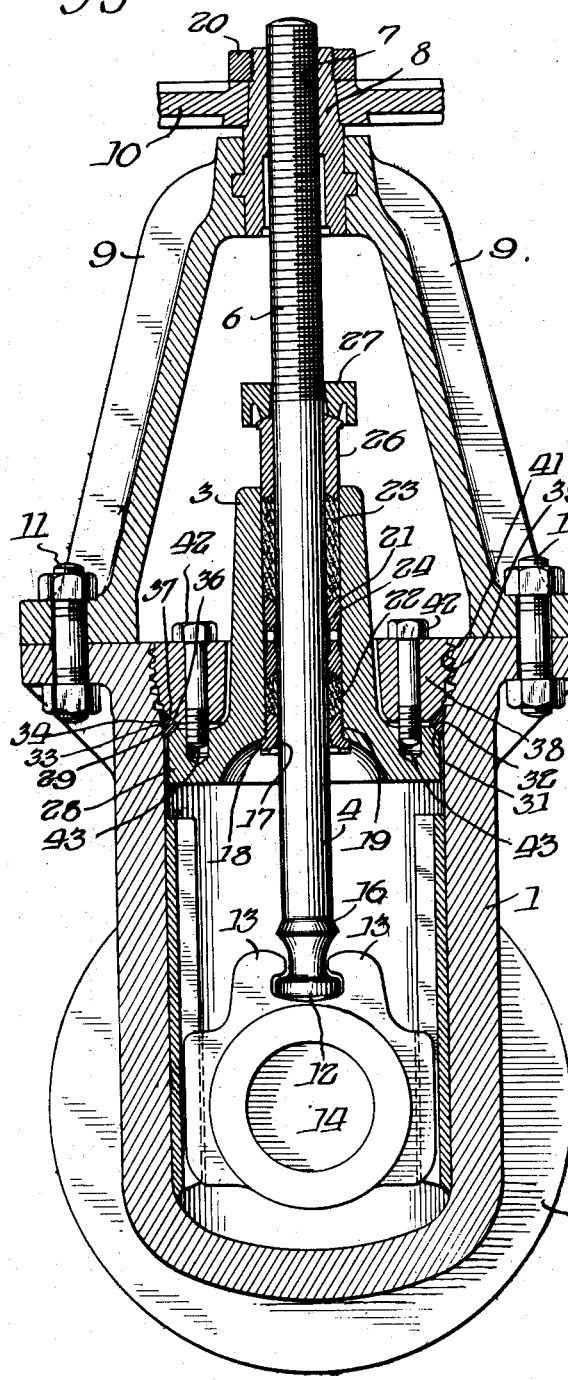
Fig. 1.
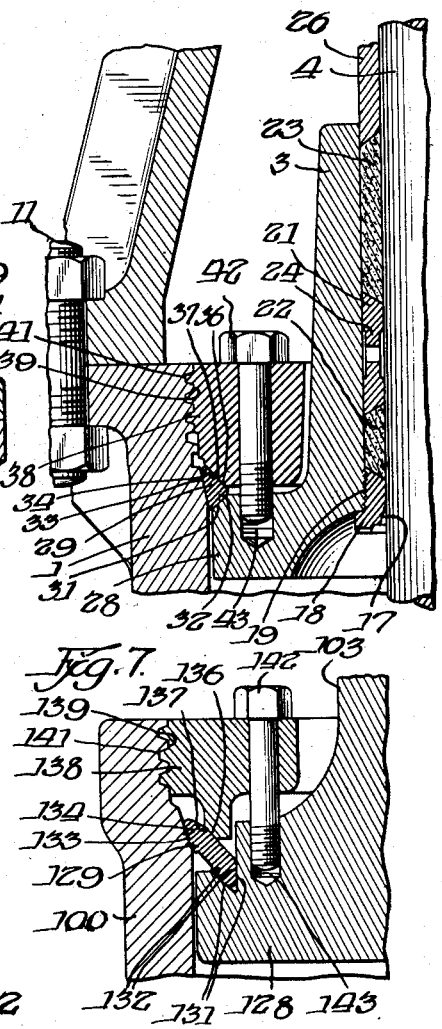
Fig. 2.
Fig. 7.
Inventors:
Adolf W. Marburg &
Richard Fennema
By: Joseph O. Lange Atty.

Patented Dec. 22, 1942

2,305,590

UNITED STATES PATENT OFFICE 2,305,590

PRESSURE SEALED JOINT

Adolf W. Marburg and Richard Fennema, Chicago, Ill., assignors to Crane Co., Chicago, Ill., a corporation of Illinois Application April 16, 1941, Serial No. 388,784

3 Claims. (Cl. 220—46)

Broadly, our invention relates to an improved type of closure member for pressure vessels, such as valves or the like in which the internal line pressure which is being carried within the vessel is utilized for the fluid sealing purpose. More particularly, our invention relates to an improved bonnet joint or closure for a valve, fitting or other pressure vessel in which such a pressure-sealing joint may be used to significant advantage, especially considering the constantly increasing pressures which are being encountered in normal service.

In the majority of present-day pressure vessels, especially in valves and related fittings, the usual construction of joints and cooperating closure members is such that the line pressure is normally opposed to the fluid seal, that is, line pressure tends to spread the sealing surfaces with resulting leakage occurring between them. Well known examples in the latter regard are the commonly used threaded joints, flanged joints, ring joints, tongue and groove joints, ball joints, and the like well known to the art.

In few cases, and then only for very specialized services, closure means have been constructed previously which utilize the pressure within the vessel for the sealing purpose. These have not been entirely satisfactory, however, for general use, especially in those cases where varying high pressure and temperature conditions exist. Accordingly their practical application has been limited.

It is therefore our purpose to provide a novel and practical means of construction of a closure member for pressure vessels which is relatively light in weight, avoiding the usual heavy flanges, and which is also economical to manufacture, being easily utilized on high pressures and high temperatures, with avoidance of leakage even when the service conditions encountered are substantially variable. A further advantage of our invention is that the construction may be readily assembled before use and disassembled after use in a relatively shorter time than previously and with a substantial reduction in the manual effort required.

Another object of our invention lies in the construction of a valve in which the yoke, or stem-supporting member, is directly connected to the body or casing independently of the connection featuring our novel pressure seal.

Another purpose of our invention is the provision of a fluid sealing joint for pressure vessels which will remain fluid-tight even under conditions of widely fluctuating temperatures.

Still another purpose lies in the provision of a pressure-tight joint which requires no periodical retightening of bolt-studs or the usual attention of frequent adjustment or inspection after the initial assembly has been completed.

A further object lies in the provision of a joint for pressure vessels in which the reactive forces therewithin are utilized to maintain a fluid seal.

Another object is the provision of a joint for a pressure vessel having a substantially triangular-shaped gasket which is maintained in fluid sealing contact with the body or casing by means of reactive forces created by a member which is preferably not in actual contact with the fluid being carried within the vessel proper.

Another purpose is the provision of a pressure-tight joint employing a gasket member in which a substantial proportion of the bearing load on one sealing face is transmitted thereto by reaction from a member abutting a non-sealing face, the latter member being out of contact with the fluid.

A still further object lies in the provision of a generally triangular-shaped cross-sectioned gasket member in which at least one of two sealing surfaces is formed with a plurality of circumferential, spaced-apart raised portions whereby high bearing or sealing stresses may be achieved, thus promoting a relatively tighter fluid seal.

Other objects and advantages will become more readily apparent from the following detailed description, illustrated in the accompanying drawings, in which Fig. 1 shows one form of our invention as applied to the body-bonnet joint of a high pressure gate valve.

Fig. 2 is a magnified fragmentary section of the joint shown in Fig. 1.

Figs. 3, 4, 5, 6 and 7 are modified forms of the gasket member illustrated in connection with Fig. 1.

Figure 3:
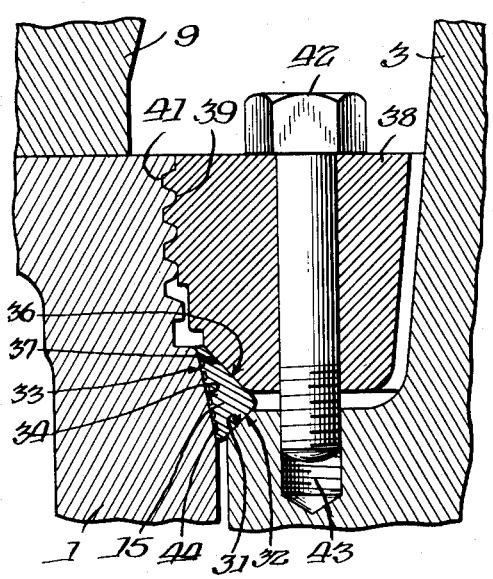

Referring to Fig. 1, we have chosen, for purposes of illustration only, a conventional valve in the adaptation of our present invention, this type of valve being known to those skilled in the art as a solid wedge disc gate valve. The type of valve or fitting used is of course not significant. In this case, the valve comprises in general the usual assembly consisting of a body or casing 1 having ports or passages therethrough which are provided with means for connecting with a pipeline, for instance the flanges 2 (only one of which is shown) which are drilled for bolting (not shown). The bonnet member or closure generally designated 3 is connected to the casing 1 by means of our novel pressure-sealing type of joint, hereinafter to be described in greater detail. A stem 4, having formed at its upper end the screw threads 6 which are engaged with like threads 7 formed in a rotatable yoke sleeve 8, is adapted to move axially upon relative rotation of the yoke sleeve 8 by means of a handwheel or operating lever 10 which is suitably connected thereto and which is held in place by the wheel nut 20. The yoke sleeve 8 is thus rotatably supported by means of the individual yoke members 9 which are bolted together at their upper end by means of the usual bolts (not shown) and are fastened directly to the body 1 by the bolts 11. The lowermost end of the stem 4 is provided with a conventional T head 12 for engagement with the projecting or hook portions 13 of the solid wedge 14, the latter member being adapted to contact seating surfaces in the casing 1 for the purpose of interrupting or stopping the flow of fluid through the valve. The stem 4 is provided with a frusto-conical back-seating surface 16 which is adapted to seat a similarly shaped surface 17 in the back-seating bushing 18 which is screwed upwardly and shouldered into the bonnet 3 by means of the threads 19. When the stem is moved upward to the limit of its travel, the abutment of the surfaces 16 and 17 causes the packing chamber generally designated 21 to be sealed from the interior of the valve, thus allowing the packing material 22 or 23 or the packing spacer 24 to be replaced or repaired without removing the valve from service. A cylindrical packing gland 26 has its lower end portion inserted into the packing chamber 21 and is adapted to compress the packings 22 and 23 by the downward movement of the gland follower member 27, the latter being movable downwardly by any suitable means, as for instance, by vertical bolts (not shown) which connect the gland follower 27 to the bonnet 3.

Referring now more particularly and in detail to our novel, improved pressure sealing joint per se as shown in Fig. 1, the bonnet or closure 3 has formed at its lowermost end a flanged portion 28. A gasket ring 29 of substantially triangular cross-section has its lower inner surface 31 normally in forcible abutment with the upper tapered surface 32 of the bonnet flange 28. The outer surface 33 of the gasket 29 abuts the tapered upwardly enlarging surface 34 formed in the body 1. The upper inner surface 36 of the gasket 29 abuts the upwardly enlarging tapered surface 37 on the back-up ring or bonnet supporting member 38 which is maintained within the casing 1 by means of the coarse screw threads 39 and 41 formed in the casing 1 and on the back-up ring 38 respectively. These screw threads 39 and 41 may be formed continuous about the respective peripheries of the casing and the back-up member whereby the two are assembled by the continuous rotation of the one with respect to the other. Alternatively, it is apparent that these threads may be made discontinuous or interrupted in a similar manner whereby the rapid assembly may be carried out simply by mating threaded peripheral portions of the one with unthreaded peripheral portions of the other, then moving the back-up ring axially the desired distance into the casing and rotating to interlock the threads. To facilitate the convenient removal of the bonnet from the body, we have found that an angle of two degrees or more from the vertical axis is preferable, although not absolutely necessary, for the tapered surfaces 33 and 34 and readily permits dismounting of the gasket and the bonnet from the casing even after the most severe operating conditions. To assemble such a valve as we have illustrated, the casing 1 is conveniently, but not necessarily, placed in an upright position and the bonnet assembly including the stem 4, the disc 14, the packing, etc., is lowered into the casing; the gasket member 29 is lowered into the annular space between the casing and the bonnet, the back-up ring 38 is screwed down snugly upon the gasket member 29, the bonnet 3 is then drawn snugly up against the lower face 31 of the gasket member 29 by means of a number of cap screws 42 which extend through the back-up ring 38 and into holes 43 drilled and tapped in the bonnet 3. In actual operation, these cap screws 42 serve to limit the downward movement of the bonnet with respect to the casing and also provide some degree of initial tightness to the fluid-sealing contacting surfaces. The cap screws 42 need not be large and usually three or four are quite sufficient since their main purpose is to hold the named units together when there is no pressure within the valve. It is obvious that any other suitable means may be used for limiting the downward movement of the bonnet, for example a large nut threadedly engaging the outside of the bonnet 3 and bearing upon the upper surface 30 of the back-up ring. Just as soon as substantial line pressure has been allowed to act upon the inner surface of the bonnet 3 the latter member is forced upwardly upon the gasket member 29 thereby moving the surfaces 31 of the member 3 and 32 of the gasket 29 and the surfaces 33 of the gaskets 29 and 34 of the casing 1 into tighter fluid-sealing contact, such contact being maintained until the pressure is again relieved from the valve at which time the cap screws 42 in the back-up ring 38 will again assume the support of the bonnet 3. It will therefore be apparent that the cap screws 42 might actually be removed as long as the pressure is maintained, without in any way affecting the tightness of the joint, since line pressure within the casing constitutes the sole means for maintaining joint tightness. Thus to complete the assembly of the valve the yoke sleeve 8 with a handwheel 10 attached by a wheel nut 20 is threaded onto the upper part of the stem 4 and then the individual yoke members 9 are bolted onto the casing 1, forming a direct connection between the yoke sleeve and the body or casing.

The manner of attaching the yoke members is similar to that novel method disclosed in the Stark et al, pending patent application, Serial No. 377,136 filed February 3, 1941. If the conventional method were employed with a pressure-sealing joint, it would have a serious drawback for, in raising the disc from a fully seated position, a tremendous downward force would be applied on the bonnet, possibly sufficient in some cases to break the seal or joint and cause line fluid to leak past the gasket member. The novel method disclosed in the application referred to for attaching the yoke is therefore preferred because it prevents application of loads to the bonnet which would counteract the pressure loads required to keep a tight joint. Further, it allows the bonnet 3 to "breathe" or to move slightly axially under the varying internal pressures and to maintain a fluid-tight seal at all times between the bonnet and the body.

We prefer to make the gasket member 29 of a material which resists substantial permanent deformation at high temperatures and high internal valve pressures. For example, we have had satisfactory results with a number of materials having a high modulus of elasticity and high compressive strength, such as ordinary steel or steel alloys. Likewise, advantageous results have been obtained with hard gasket materials which have low moduli of elasticity combined with high compressive strengths, such as cast iron.

To our knowledge no one previously has constructed a joint, pressure-sealing or otherwise, which would remain absolutely pressure-tight on rapid temperature changes of the fluid within the vessel, especially upon the occurrence of sudden temperature drops. An example of such service is encountered in certain oil refining processes where valves and fittings are normally used at 1100 degrees Fahrenheit, but at a certain point in the refining cycle it is necessary almost instantly to discharge the 1100 degrees fluid and introduce another fluid at 850 degrees. Another example of such service is in steam power plants which normally operate with superheated steam, the temperature differential being produced when bringing an additional boiler onto the already hot line; the oncoming boiler cuts in at substantially saturated temperature which is usually many degrees below the normal operating temperature. This results in sudden contraction of the surfaces which are in direct contact with the fluid, high stress variations are set up within the various parts and momentary warpage of gaskets and sealing surfaces cause normally abutting sealing surfaces to spread apart momentarily and to leak until thermal equilibrium is re-established at the lower temperature. The latter leakage occurring each time the pressure system is quenched in this manner may cause serious erosion of the sealing surfaces to the ultimate extent that they may not be leak-proof even under constant temperature conditions.

In the light of tests performed on our novel joint, it will not leak on such sudden temperature changes as described. The behavior of our joint, as illustrated in connection with the structure shown in Figs. 1 and 2, is briefly as follows: Assume that the valve is installed in a suitable pipe line, for instance on the oil refinery service above mentioned. Fluid pressure acting on the lower area of the bonnet 3 will cause it to be maintained against the gasket 29. The force resulting from the application of internal pressure to the bonnet is of course equal to the pressure times the area, and a substantial proportion of this pressure is transmitted through the gasket 29 directly to the tapered surface 37 on the back-up ring 38; it is apparent that only a small proportion of this pressure is transmitted directly to the casing surface 34. By reason of the taper of the surface 37 a reaction component of the pressure is directed outwardly and downwardly and serves to press the outside sealing surface 33 of the gasket into fluid-sealing abutment with the casing surface 34. The angle, with respect to the horizontal, of the tapered surfaces 31 and 32 of the gasket and bonnet, respectively, should preferably be less than 75 degrees so that the bonnet will not stick or bind when forced upwardly upon the gasket by the internal pressure. By constructing this angle at less than 75 degrees the bonnet is free to "breathe" or move reciprocally, as previously referred to, when the pressure and temperature within the valve changes. In order that the back-up ring surface 37 may have sufficient taper to transmit a substantial portion of the pressure to the outer sealing surfaces 33 and 34, it is preferred that the angle included by the gasket surfaces 33 and 36 (and of course by the surfaces 34 and 37) should not exceed 45 degrees. It is obvious then that fluctuating temperatures cannot break the fluid seal between the surfaces 31 and 32 since circumferential expansion or contraction of the bonnet flange 28 will be compensated either by corresponding downward or upward reciprocation of the entire bonnet 3. It is also apparent that sudden temperature changes within the valve will have no immediate effect upon the back-up ring 38 since it is entirely out of contact with the fluid stream. Consequently, there will be no radial deformation of the back-up ring surface 37 and therefore the reaction component of the pressure which acts to produce the seal between the surfaces 33 and 34 of the gasket and the casing will remain undisturbed.

The angular configurations of two samples of our invention which have given particularly satisfactory results on quenching service as above described are as follows:

|  | 1st sample | 2nd sample |
| --- | --- | --- |
|  | Degrees | Degrees |
| Angle of bonnet surface 32 from vertical axis | 65 | 45 |
| Angle of casing surface 34 from vertical axis | 4 | 10 |
| Angle included between casing surface 34 and back-up ring surface 37 | 29 | 35 |

Referring now to Fig. 3, an alternative gasket construction is shown. In explanation of this modification, in some instances the reactionary force from the back-up ring surface 37 may be insufficient to seal the surfaces 33 and 34 due to the relatively large bearing area on these surfaces causing a low unit load. The unit load may be desirably increased by decreasing the contacting area of these surfaces. Fig. 3 illustrates a modification of a gasket 15 where circumferential grooves 44 are formed in the surface 33. Obviously similar results would be obtainable by grooving the body surface 34 instead.

Figure 4:
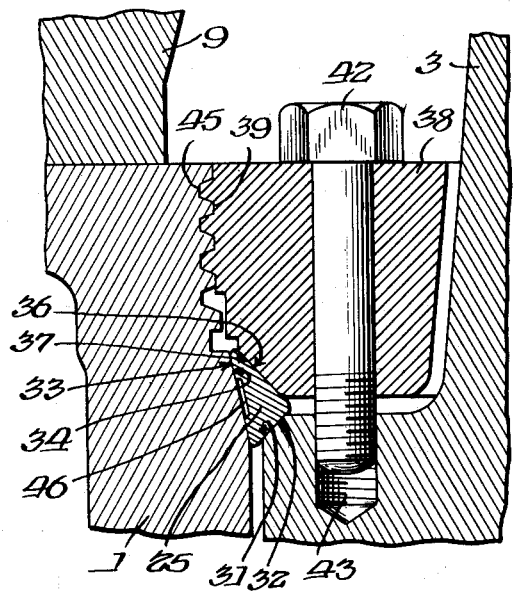

Fig. 4 is a further modification along the lines of Fig. 3 in which only a single groove 46 of the gasket 25 is employed, the groove functioning also as a sealing medium.

In some cases the relative movement of the gasket under load with respect to other contacting surfaces may mar one surface or the other. This would be especially true in such cases in which one surface has a relatively hard and sharp corner in contact with a flat portion of a softer material. Even slight relative movement of such surfaces under load would cause the softer material to be objectionably marred by the harder surface.

Figure 5:
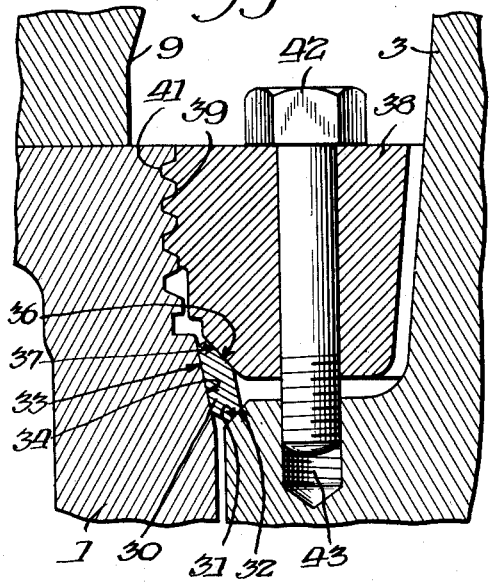
Figure 6:
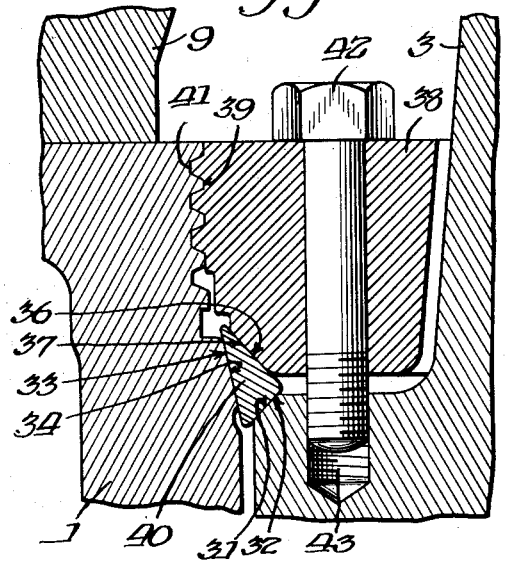

Fig. 5 therefore illustrates a preferred construction where the gasket 30 is of relatively softer material than the casing, back-up ring and bonnet; conversely Fig. 6 illustrates a preferred form where the gasket 40 is composed of a material relatively harder than the contacting surfaces.

In Fig. 7 another modified form of our device is shown in the casing 100 having movably positioned therewithin the bonnet or closure 103. At the lower periphery of the closure 103 is a flanged portion 128 having an upwardly facing groove defined by the inner and outer walls 132, the inner and outer surfaces 131 of the gasket ring 129 cooperating therewith to form a fluid-sealing joint. The upper outside surface 133 of the gasket ring is normally forced into contact with the inner casing surface 134 by reactionary forces originating at the surfaces 136 and 137 of the gasket and the back-up ring respectively. While in service, the joint will not leak even if considerable contraction of the closure 103 takes place due to quenching, for in such case rotation of the cross-section of the ring about the common surfaces 136 and 137 will result only in higher fluid sealing loads at the respective gasket and bonnet outer contact surfaces 131 and 132 and also at the respective gasket and casing contact surfaces 133 and 134. As in the modifications already discussed, the back-up ring 138 is maintained within the casing by means of the threaded surfaces 139 and 141; and the parts are assembled initially by means of a number of cap screws 142 threaded into bolt holes 143 in the member 128.

While we have described our joint as particularly applicable to valves and have disclosed a new method of supporting the stem in any valve in which our joint is employed, it should nevertheless be obvious that it is applicable to a valve not having a stem and to any kind of a pressure vessel where access to the interior must be provided without the necessity of cutting a welded joint or otherwise destroying or permanently modifying a part of the structure. Accordingly, we desire to be limited only within the spirit of the appended claims.

We claim:

1. A self-sealing pressure-tight joint for a pressure vessel comprising in combination, a casing having an opening therein, a longitudinally movable member having limited movement within said opening, a back-up ring fixedly mounted within said opening exteriorly of said movable member, the assembly of the said movable member, the said casing and the said back-up ring forming therebetween at least a three-walled annular chamber in communication with the casing opening, a substantially triangular gasket filling the said chamber relatively completely, the first of the said walls consisting of a downwardly extending surface formed on said movable member and having an angular inclination from the vertical axis greater than approximately 15 degrees, the second of said walls consisting of an upwardly extending surface formed within the said opening and having an angular inclination from the vertical axis of at least 2 degrees and forming an acute angle with said first named wall, the third of the said walls being formed on the said back-up ring and inclined to form an acute angle with the second of said walls and having such an angular inclination with respect to the vertical axis of the said movable member that a substantial proportion of the force exerted on the movable member by the internal fluid pressure within the valve is transformed into a reactionary force which is effective in urging the gasket and the casing into fluid-sealing contact.

2. A self-sealing pressure-tight joint for a pressure vessel or the like comprising in combination, a casing having an opening therein, a longitudinally movable member within the said opening, a back-up ring fixedly positioned within the said opening between the said movable member and the said casing, the said movable member, casing, and back-up ring having formed therebetween a three-walled annularly extending chamber, the inner lower wall of the said chamber consisting of an inclined portion of the said movable member, the inner upper wall of the said chamber consisting of an inclined portion of said back-up ring, the inclined portion of the said movable member and the inclined portion of the said back-up ring forming substantially a right angle therebetween, the outer wall consisting of an inclined portion formed in said casing opposite said inner upper and lower walls, a triangular-shaped annular gasket fitted snugly within the said chamber, whereby upon the occurrence of internal pressure within the valve, the said movable member is forced upwardly into fluid-sealing contact with the inner lower surface of said gasket which is in turn forced against the said inclined portion of said back-up ring whereupon reactionary forces are created to move the outer annular surface of the gasket into fluid-sealing contact with the outer wall of the said casing.

3. A self-sealing pressure-tight joint for a pressure vessel comprising in combination, a casing having an upper opening therein, a longitudinally movable member depending within the said opening, a supporting member for the said movable member annularly engaging the periphery of the said opening, the said movable member, casing, and back-up ring having formed therebetween a multi-walled annularly extending chamber, the lower inner wall consisting of a downwardly-expanding frusto-conical surface on said movable member, the upper inner wall consisting of an upwardly-expanding frusto-conical surface upon the said supporting member, the outer wall thereof consisting of an upwardly-expanding frusto-conical surface in the wall of said opening, the said upper inner wall and the said outer wall including an angle of less than 45 degrees, the said outer wall having an angularity from the vertical axis of at least 2 degrees, the said lower inner wall having an angular displacement from the horizontal of less than 75 degrees, a gasket ring formed and fitted within the said annular gasket chamber in such a manner that the corresponding gasket surfaces and chamber walls form a substantially flat abutting contact therebetween, whereby upon the accumulation of pressure within the valve the outer surfaces of the gasket and gasket chamber are urged into fluid-sealing abutment under the urge created when said pressure moves the said gasket outward against the frusto-conical surface upon the said supporting member.

ADOLF W. MARBURG.
RICHARD FENNEMA.